(12) United States Patent
Abramov et al.

(10) Patent No.: US 10,041,147 B2
(45) Date of Patent: *Aug. 7, 2018

(54) METHOD FOR RECOVERING RARE EARTH METALS FROM SOLID MINERALS AND/OR BY-PRODUCTS OF SOLID MINERAL PROCESSING

(71) Applicant: TWIN TRADING COMPANY, Moscow (RU)

(72) Inventors: Yakov Kuzmich Abramov, Moscow (RU); Vladimir Mihailovich Veselov, Moscow (RU); Viktor Mihailovich Zalevsky, Moscow (RU); Vitaly Grigorievich Tamurka, Moscow (RU); Veniamin Sergeevich Volodin, Vidnoye (RU); Nikolay Aleksandrovich Gukasov, Moscow (RU); Aleksandr Pilgun, Moscow (RU); Vladimir Evdokimov, Moscow (RU); Olga Vatueva, Moscow (RU)

(73) Assignee: TWIN TECHNOLOGY COMPANY, Moscow (RU)

( * ) Notice: Subject to any disclaimer, the term of this patent is extended or adjusted under 35 U.S.C. 154(b) by 127 days.

This patent is subject to a terminal disclaimer.

(21) Appl. No.: 14/441,850

(22) PCT Filed: Nov. 11, 2013

(86) PCT No.: PCT/RU2013/000999
§ 371 (c)(1),
(2) Date: May 10, 2015

(87) PCT Pub. No.: WO2014/074029
PCT Pub. Date: May 15, 2014

(65) Prior Publication Data
US 2015/0284822 A1   Oct. 8, 2015

(30) Foreign Application Priority Data
Nov. 12, 2012  (RU) .................................. 2012147893

(51) Int. Cl.
| | | |
|---|---|---|
| *C22B 3/20* | (2006.01) |
| *C22B 59/00* | (2006.01) |
| *C22B 3/42* | (2006.01) |
| *C22B 7/00* | (2006.01) |
| *C22B 3/06* | (2006.01) |
| *C22B 3/08* | (2006.01) |

(52) U.S. Cl.
CPC .............. *C22B 59/00* (2013.01); *C22B 3/065* (2013.01); *C22B 3/08* (2013.01); *C22B 3/42* (2013.01); *C22B 7/007* (2013.01); *Y02P 10/234* (2015.11)

(58) Field of Classification Search
None
See application file for complete search history.

(56) References Cited

U.S. PATENT DOCUMENTS 8,470,270 B2    7/2013  Abramov

FOREIGN PATENT DOCUMENTS

| EP | 0522234 | 1/1993 |
| PL | 155815 | 6/1993 |
| RU | 2225892 | 3/2004 |
| RU | 2293781 | 2/2007 |
| RU | 2337879 | 11/2008 |
| RU | 2412265 | 7/2009 |
| RU | 2458863 | 2/2011 |
| WO | WO2014074029 | 5/2014 |

OTHER PUBLICATIONS

Lokshin E.P. end al."Problems of separation of rare-earth metals while sulphuric acid processing the khibini apatite concentrate". Journal "Metals", RU # 1, 2001.

*Primary Examiner* — Melissa S Swain
(74) *Attorney, Agent, or Firm* — Yefim Kreydin

(57) ABSTRACT

The invention relates to the technology of recovery of rare-earth elements form both solid fossil and technology-related materials obtained by means of their target-oriented processing. Rare-earth elements recovery method include the acid leaching of ground to less than 100 μm solid fossil and technology-related materials with the mixture of sulphuric and nitric acid at ratio from 6:1 to 1:1 mass parts, at the concentration in mixture of acids less than 15 wt. % at liquid/solid phases ratio of L:S from 2:1 to 6:1 mass parts. During the leaching operation progress the vacuum-impulse action is conducted during all operation of transferring of rare-earth elements compounds into a solution and obtaining of a precipitate of remained solid fossil and technology-related materials. The obtained precipitate of solid fossil and technology-related materials is separated from leaching solution.

Separation of rare-earth elements from leaching solution is conducted using ion-exchange filter or membrane filter.

3 Claims, No Drawings

METHOD FOR RECOVERING RARE EARTH METALS FROM SOLID MINERALS AND/OR BY-PRODUCTS OF SOLID MINERAL PROCESSING

This application is the United States national phase application of International Application PCT/RU2013/000999 filed Nov. 11, 2013, which claims the benefit of Russian Patent application No RU 20121417893 Filed Nov. 12, 2012, the entire disclosure of which is incorporated herein by reference.

BACKGROUND AND SUMMARY OF THE INVENTION

The invention covers the technology of recovery of rare-earth elements: in particular chemical compounds of rare-earth elements (REEs) form both solid fossil and technology-related materials, obtained by means of their target-oriented processing.

Fossil, such as loparite, apatite etc. contains much more of REEs as compared with phosphogypsum produced from apatites. Loparite concentrate together with REEs contains considerable amounts of such valuable elements as Nb, Ta and Ti and the REEs recovery technology must be accompanied by the relevant phases of recovery of Nb, Ta and Ti. The greater part of known technologies of REEs recovery from both solid fossil and technology-related materials is based on leaching of REEs and other valuable metals with any of one acids (sulphuric or nitric) or their mixture followed by the crystallization of obtained salts or complex compounds of metals.

REEs recovery from solid fossil is conducted after the concentrate enrichment and obtaining. Such products, for example, as valuable metals Ta, Nb, Ti etc., which are produced from loparite or phosphorous and nitrogenous fertilizers, which are produced from apatite. Acids of high concentrations are use for primary processing of concentrates, and the process is conducted at elevated, temperatures. REEs content in start concentrates is low and REEs is the technology-related wastes, one of which is phosphogypsum.

Phosphogypsum is obtained by sulphuric acid processing of apatite concentrate to obtain mineral fertilizers and it contains considerable amount of impurities, which are the compounds of rare-earth and other elements in total up to 19%. REEs part in phosphogypsum is equal to 0.5-1.1%.

Currently in use the method of recovery of REEs from phosphogypsum (see patent RU No 2225892 МПК C22B 59/00) including the processing of phosphogypsum with sulphuric acid solution. REEs recovery rate is equal to 50.0-60.2%. Duration of such acid processing totals 3 h, at that the sulphuric acid concentration totals 20-25% wt. at liquid/solid phases ratio of L:S=2–3, REEs crystallization is conducted by means of seed introduction in the form of REEs sulphates at L:S=more that 100. Such technology requires many processing equipment units. Disadvantages of this method include also low REEs recovery rate, considerable amounts of processing operations, great volumes of sulphuric add solutions and great, time spending.

Currently in use the method of phosphogypsum processing (see patent RU No 2337879, МПК C01F 11/46), according to which for 20-25 mm, and at the expense of processing with 22-30% sulphuric acid solution the extraction of REEs and phosphorus compounds is conducted into a solution and separation of insoluble residue in the form of gypsum, which contains the considerable amounts of sulphuric and phosphoric acid. As part of extraction solution the REEs, Na and K sulphates are also presented. The obtained crystalline gypsum is processed with such reagents as $Ca(OH)_2$, or CaO, or $CaCO_3$ to neutralize the residues of sulphuric and phosphoric acid to pH>5. At that, the phosphorus impurity content in mother liquor should be controlled and depending upon ratio of its content and gypsum residual humidity to direct the mother liquor to the extraction stage or purify it by introduction of $TiOSO_4.H_2O$ to allowable content of $P_2O_5$.

This method allows realizing the REEs recovery rate up to 68.5%.

The disadvantages of said method include the obtaining of crystalline gypsum with high concentration of $P_2O_5$. Separation of lanthanides from supersaturated extraction solution required considerable time consumption (2 hours). The content of phosphorus impurities in acid extracting agent and residual moisture of gypsum precipitate should be controlled. To purify against phosphorus excess it is necessary to have the equipment to neutralize the phosphorus compounds with titanium compounds in dry form or in mixture with concentrated sulphuric acid followed by titanyl phosphate separation and mandatory processing with concentrated sulphuric acid. A considerable amount of reactor, vessel, filer and other equipment is required for REEs extraction, storage of various extraction solutions and neutralization, of phosphorus compounds.

Currently in use the method of REEs recovery from apatite (see patent RU No 2458863 МПК C01F17/00) including the decomposition of apatite with sulphuric acid, freezing out, separation of REEs phosphate concentrate precipitate and its washing with acidified water.

The disadvantages of this method include the high temperature of nitrate-phosphate solution while neutralizing (85-95° C.), which has an adverse effect on REEs production economic performances and low efficiency of suspension filtration operation (1.5 $m^3/m^2$ per hour.)

The closest method to proposed method is the method developed by the Applicant (see patent RU No 2412265, МПК C22B 59/00) of REEs recovery from phosphogypsum comprising the acid extinction (leaching) of REEs from phosphogypsum while stirring the extraction suspension, separation of insoluble precipitate of crystalline gypsum from extraction solution and recovery from extraction solution the REEs, wherein the acid extraction is conducted by the solution of mixture sulphuric and nitric acid in the ratio from 3.2 to 1.2 and concentration from 1 to 5 wt. % at ratio L:S from 4 to 5 daring from 8 to 12 minutes at simultaneous hydroacoustic effect on mixed extraction suspension, and the recovery of REEs from extraction solution is conducted by cation-exchange sorption by means of passing extraction solution through a cation-exchange filter.

This method allows increasing the recovery rate of REEs from phosphogypsum, decreasing the leaching operation time, and reducing the amounts of used reagents at lower concentrations and volumes of acid reagents.

However this method similar the first two ale closest prior arts can not be used to recover REEs from solid fossil, requiring higher acid concentrations and extra costs for processing.

The present invention is directed to achieve the technical result involving the improvement of effectiveness of recovery of REEs not only from technology-related waste such as phosphogypsum as well as solid fossil containing REEs in parallel with the method simplification.

The technical result is achieved by the fact that in accordance with the method of recovery of REEs from solid fossil and/or technology-related materials containing REEs, comprising the acid leaching of compounds of REEs from solid fossil and/or technology-related materials with the solution of mixture of sulphuric and nitric acid while stirring the leaching solution and transferring of REEs compounds into the solution and obtaining insoluble precipitate, remaining after opened solid fossil and/or technology-related material, the separation of insoluble precipitate from leaching solution and recovery of compounds of REEs from leaching solution, according to the invention, print to acid leaching the grinding of material particles is conducted to the size less than 100 μm, and the leaching operation is conducted at simultaneous vacuum-impulse action with the ratio in mixture of sulphuric and nitric acids from 6:1 to 1:1 mass parts at the concentration in mixture of acids less than 15 wt. % and ratio L:S from 2:1 to 6:1 mass parts.

The recovery of REEs compounds from leaching solution can be performed by passing them through, cation-exchange filter.

The recovery of REEs compounds from leaching solution can be performed by passing them through membrane filter.

Due to this solution the possibility of recovery of REEs not only from technology-related materials (phosphogypsum) but also solid fossil, in parallel with the method significant simplification.

At prior grinding of start material particles both fossil and technology-related and simultaneously with the opening and increase their surfaces the intensive sorption of atmospheric gases occurs, impacting on retarding effect of leaching REEs into acid solution. The conducting of vacuum-impulse action, from initial stage of leaching to its completion allows excluding the negative effect of adsorbed gases and formed as a result of interaction with acids the REEs compounds, covering opened surfaces of processed material on wetting and REEs recovery rate.

When processing the ground materials with solution of mixture of sulphuric and nitric acids the interaction between REEs and sulphuric and nitric acids occurs. As a result of interaction with sulphuric acid a sufficient quick dissolution of REEs compounds occurs. Simultaneously Na and K cations pass into the solution, which form with REEs the double sulphates. Solubility of doable sulphates both of Na with REEs md K with REEs is low and in nitric acid is good (see Lokshin E. P. et al. "Problems of separation of rare-earth metals while processing the Khibhii apatite concentrate". J. "Metals", #1, 2001.)

As exemplified by such materials as apatite concentrate and phosphogypsum, it has been deduced from experiments that the grinding of start material up to less that 100 μm with dynamic mill allows increasing the reactivity of REEs compounds under vacuum-impulse action while leaching with mixture of sulphuric and nitric acids of ratio from 6:1 to 1:1 mass parts at concentrations of acids less than 15 mass % under intensive stirring. Vacuum-impulse action has been conducted during the whole leaching operation under pressure from 0.1 to 12 kPa. The conducting of acid leaching operation at ratio L:S from 2:1 to 6:1 with the mixture of sulphuric and nitric acids excludes the possibility of spontaneous crystallization of REEs before the gypsum separation, as well as it is optimally to ensure suspension stable stirring. Listed parameters of process conducting ensure the separation rate of other impurities from crystals. Upon leaching operation completing the suspension is transferred to a separating device, e.g. centrifuge or filter where the separation of crystalline gypsum from a solution takes place.

Further the recovery of REEs from leaching solution occurs, e.g. by cation-exchange sorption by means of passing the solution through cation-exchange filter and the following desorption of REEs with ammonium sulphate or other similar desorbent. Passed through cation-exchange filter solution is water solution of sulphuric and nitric acids, which after the recovery of acids ratio is returned to a process for the following REEs recovery.

DETAILED DESCRIPTION OF THE EXEMPLARY EMBODIMENTS

The essence of the claimed method can be explained with the following examples.

EXAMPLE 1

One of the technology-related origin materials—apatite phosphogypsum—was used as a solid and technology-related material. The influence of phosphogypsum grinding on REEs leaching rate is illustrated with the examples, shown in table 1 where the samples of phosphogypsum of different dispersibility were used.
- sample No 1 (origin phosphogypsum)—of particle size more than 100 μm, obtained by screening of fine fractions from refuse tips;
- sample No 2—of particle size less than 10-15 μm, obtained by grinding of origin in rotary-pulse device;
- sample No 3—of particle size less than 100 μm, obtained by grinding of origin in dynamic activator;

When processing all three samples the similar modes of REEs leaching were maintained.

| | |
|---|---|
| mass of samples | 50 g.; |
| total REEs content in a sample | 437 mg.; |
| ratio (mass) of sulphuric and nitric acids | 3:1; |
| concentration (mass) of acids mixture | 5%; |
| ratio (mass) of liquid and solid phases (L:S) | 5:1; |
| leaching duration at 20° C. | 15 min. |

The leaching operation was performed with vacuum-impulse action under pressure 1 kPa.

Table #1 shows the experiment results.
Dependence of REEs leaching rate on phosphogypsum dispersibility.

TABLE #1

| Phosphogypsum sample | Phosphogypsum particle size, μm | REEs* content in solution, mg | Leaching rate, % |
|---|---|---|---|
| No 1 (origin) | more than 100 | 323.1 | 73.8 |
| No 2 | less than 10-15 | 416.9 | 95.4 |
| No 3 | less than 100 | 377.1 | 86.3 |

*Note:
expressed as solids content.

The effectiveness of REEs recovery by leaching was estimated by total REEs leaching rate.

REEs content in the original sample and solution was determined by data of mass-spectral method with inductively coupled plasma.

As it follows from Table #1, the REEs leaching rate from, phosphogypsum increases significantly while phosphogypsum dispersibility increasing and achieve the value of 95.4% when using particle size less than 10-15 μm. As a result the REEs recovery rate from phosphogypsum increases essentially.

EXAMPLE 2

Loparite concentrate grade of KL-1 is used as material. The influence of loparite concentrate grinding on REEs leaching rate is illustrated with the examples, shown in Table #2, where two samples of material of different dispersibility were used:

sample #1 (original concentrate)—particle size up to 75 μm;

sample #2—particle size less than 100 μm.

When processing samples the similar modes of REEs leaching were maintained.

| | |
|---|---|
| mass of samples | 50 g.; |
| total REEs content in a sample | 510 mg.; |
| ratio (mass) of sulphuric and nitric acids | 2:1; |
| concentration (mass) of acids mixture | 5%; |
| ratio (mass) of liquid and solid phases (L:S) | 4:1; |
| leaching duration at 50° C. | 30 min. |

The leaching operation was performed with vacuum-impulse action under the pressure of 1-2 KPa.

Table #2 shows the experiment results.

TABLE #2

| Loparite concentrate sample | Loparite concentrate particles size, μm | REEs* content in solution, mg | Leaching rate, % |
|---|---|---|---|
| No 1 (origin) | up to 75 | 465.0 | 91.1 |
| No 2 | less than 100 | 370.0 | 72.5 |

*Note:
expressed as solids content.

Therefore, the claimed method of recovery REEs from solid fossil and technology-related materials allows increasing the REEs leaching rate not only from technology-related waste such as phosphogypsum as well as solid fossil containing REEs in parallel with the method simplification.

What is claimed is:

1. A method of recovery of rare-earth elements from solid fossil and/or technology-related materials containing rare-earth elements, comprising a acid leaching of compounds of rare-earth elements from materials with a solution of mixture of sulphuric and nitric acid while stirring the leaching solution and transferring of rare-earth elements compounds into the solution and obtaining of insoluble precipitate of remaining solid material, a separation of insoluble precipitate from the leaching solution and recovery of compounds of rare-earth elements from the leaching solution, wherein prior to acid leaching a grinding of material particles is conducted to a size of less than 100 μm, and the leaching operation is conducted at simultaneous vacuum-impulse action with a ratio in mixture of sulphuric and nitric acids from 6:1 to 1:1 mass parts at a concentration in mixture of acids less than 15 wt. % at liquid/solid phases ratio (L:S) from 2:1 to 6:1 mass parts.

2. Method of claim 1, wherein the rare-earth elements recovery from leaching solution is perforated by passing leaching solution through a cation-exchange filter.

3. Method of claim 1, wherein the rare-earth elements recovery from leaching solution is performed by passing leaching solution through a membrane filter.

* * * * *